(12) United States Patent
Zhang et al.

(10) Patent No.: US 10,846,332 B2
(45) Date of Patent: Nov. 24, 2020

(54) PLAYLIST LIST DETERMINING METHOD AND DEVICE, ELECTRONIC APPARATUS, AND STORAGE MEDIUM

(71) Applicant: GUANGZHOU KUGOU COMPUTER TECHNOLOGY CO., LTD., Guangzhou (CN)

(72) Inventors: Long Zhang, Guangzhou (CN); Shenyuan Li, Guangzhou (CN)

(73) Assignee: GUANGZHOU KUGOU COMPUTER TECHNOLOGY CO., LTD., Guangzhou (CN)

(*) Notice: Subject to any disclaimer, the term of this patent is extended or adjusted under 35 U.S.C. 154(b) by 275 days.

(21) Appl. No.: 15/968,675

(22) Filed: May 1, 2018

(65) Prior Publication Data

US 2018/0246962 A1  Aug. 30, 2018

Related U.S. Application Data

(63) Continuation of application No. PCT/CN2016/082203, filed on May 16, 2016.

(30) Foreign Application Priority Data

Oct. 21, 2015  (CN) .......................... 2015 1 0688392

(51) Int. Cl.
*G06F 16/638* (2019.01)
*G06F 16/635* (2019.01)
(Continued)

(52) U.S. Cl.
CPC ............ *G06F 16/639* (2019.01); *G06F 16/00* (2019.01); *G06F 16/24578* (2019.01);
(Continued)

(58) Field of Classification Search
CPC .......... G06F 16/9535; G06F 16/24578; G06F 16/4387; G06F 16/78; G06F 16/40;
(Continued)

(56) References Cited

U.S. PATENT DOCUMENTS

| 10,223,438 B1* | 3/2019 | Xu ................... H04N 21/26258 |
| 2006/0020662 A1* | 1/2006 | Robinson ................ H04L 51/32 709/203 |

(Continued)

FOREIGN PATENT DOCUMENTS

| CN | 102004785 A | 4/2011 |
| CN | 102402625 A | 4/2012 |
| CN | 103793537 A | 5/2014 |

OTHER PUBLICATIONS

Guangzhou Kugou Computer Technology Co., Ltd., International Search Report and Written Opinion, PCT/CN2016/082203, dated Aug. 22, 2016, 15 pgs.

(Continued)

*Primary Examiner* — Angelica Ruiz
(74) *Attorney, Agent, or Firm* — Morgan, Lewis & Bockius LLP

(57) ABSTRACT

Embodiments of the present disclosure provide a playlist list determining method and device, an electronic apparatus, and a storage medium. The method comprises: determining feature data of music features comprised in preselected playlists and feature data of music features of preferences of a target user, wherein the music features comprised in the preselected playlists correspond to the music features of the preferences of the target user; calculating correlation coefficients between the feature data of the music features comprised in the preselected playlists and the feature data of the music features corresponding to the preferences of the target user; and determining the preselected playlists to be candidate playlists when the correlation coefficient between (Continued)

the feature data of the music features comprised in the preselected playlists and the feature data of the music features corresponding to the preferences of the target user meets a preset condition.

20 Claims, 7 Drawing Sheets

(51) Int. Cl.
*G06F 16/68* (2019.01)
*G06F 16/2457* (2019.01)
*G06F 16/00* (2019.01)
*G06Q 30/02* (2012.01)
*G06F 16/438* (2019.01)
*G06Q 30/06* (2012.01)

(52) U.S. Cl.
CPC ........ *G06F 16/4387* (2019.01); *G06F 16/635* (2019.01); *G06F 16/68* (2019.01); *G06F 16/686* (2019.01); *G06Q 30/02* (2013.01); *G06Q 30/0631* (2013.01)

(58) Field of Classification Search
CPC .... G06F 16/951; G06F 16/73; G06F 16/3331; G06F 16/3334; G06F 16/00; G06F 16/635; G06F 16/64; G06F 16/68; G06F 16/285; G06F 16/639; G06F 16/735

USPC .......... 707/600–831, 899, 999.001–999.206
See application file for complete search history.

(56) References Cited

U.S. PATENT DOCUMENTS

| | | | |
|---|---|---|---|
| 2009/0019034 A1* | 1/2009 | Franks | G06F 16/40 |
| 2010/0325135 A1* | 12/2010 | Chen | G10H 1/0008 |
| | | | 707/759 |
| 2010/0328312 A1* | 12/2010 | Donaldson | G06F 16/639 |
| | | | 345/440 |
| 2011/0288929 A1 | 11/2011 | Mei et al. | |
| 2014/0365484 A1* | 12/2014 | Freeman | H04W 4/21 |
| | | | 707/736 |
| 2014/0380146 A1* | 12/2014 | Mollis | G06F 16/4387 |
| | | | 715/234 |
| 2016/0055420 A1* | 2/2016 | Karanam | A61B 5/165 |
| | | | 700/52 |
| 2017/0169341 A1* | 6/2017 | Tang | G06F 16/9535 |
| 2017/0308794 A1* | 10/2017 | Fischerström | G06F 16/48 |

OTHER PUBLICATIONS

Guangzhou Kugou Computer Technology Co., Ltd., International Preliminary Report on Patentability, PCT/CN2016/082203, dated Apr. 24, 2018, 4 pgs.

* cited by examiner

PLAYLIST LIST DETERMINING METHOD AND DEVICE, ELECTRONIC APPARATUS, AND STORAGE MEDIUM

PRIORITY CLAIM AND RELATED APPLICATION

This application is a continuation application of PCT/CN2016/082203, entitled "PLAYLIST LIST DETERMINING METHOD, DEVICE, ELECTRONIC DEVICE AND STORAGE MEDIUM" filed on May 16, 2016, which claims priority to Chinese Patent Application No. 201510688392.X, filed with the State Intellectual Property Office of the People's Republic of China on Oct. 21, 2015, entitled "PLAYLIST LIST DETERMINING METHOD, DEVICE, AND ELECTRONIC DEVICE", both of which are incorporated herein by reference in their entirety.

TECHNICAL FIELD

The present disclosure relates to the technical field of playlist data processing, and in particular, to a playlist list determining method and device, an electronic apparatus, and a storage medium.

BACKGROUND

A playlist list is a playlist set recommended to a user by a music player application. A playlist may be a set of multiple songs. The music player application, such as a webpage providing a music playing service, is a client installed on a user terminal to provide the music playing service.

At present, a playlist list determination approach mainly includes: selecting, according to the type of a playlist list, playlists with types corresponding to the type of the playlist list from a playlist library, and gathering the selected playlists into the playlist list. If the type of a playlist list is hot, hot playlists can be selected from the playlist library, and the selected hot playlists are gathered into the playlist list to form a playlist list having the hot playlists.

SUMMARY

Embodiments of the present disclosure provide a playlist list determining method and device, an electronic apparatus, and a storage medium, so that playlists in a playlist list have a relatively high correlation with a user to which a recommendation is made, thereby providing the probability of improving the listening conversion rate of the playlist list.

To achieve the purpose above, an embodiment of the present disclosure provides the following technical solution:

According to a first aspect of the present disclosure, a playlist list determining method is performed at an electronic apparatus having one or more processors and memory storing a plurality of program instructions be executed by the one or more processors, the method comprising:

determining feature data of music features included in preselected playlists and feature data of music features of preferences of a target user, wherein the music features included in the preselected playlists correspond to the music features of the preferences of the target user;

calculating correlation coefficients between the feature data of the music features included in the preselected playlists and the feature data of the music features corresponding to the preferences of the target user; and determining the preselected playlists to be candidate playlists when the correlation coefficients between the feature data of the music features included in the preselected playlists and the feature data of the music features corresponding to the preferences of the target user meet a preset condition.

According to a second aspect of the present disclosure, an electronic apparatus has one or more processors, memory coupled to the one or more processors, and a plurality of program instructions stored in the memory that, when executed by the one or more processors, cause the electronic apparatus to perform the aforementioned method.

According to a third aspect of the present disclosure, a non-transitory computer readable storage medium stores a plurality of program instructions in connection with an electronic apparatus having one or more processors. The plurality of program instructions, when executed by the one or more processors, cause the electronic apparatus to perform the aforementioned method.

Based on the technical solutions above, the probability that the target user prefers the playlists in the playlist list is enhanced, so that the probability that the target user clicks and listens to the playlist list determined by the embodiments of the present disclosure after being recommended to the target user is enhanced, thereby providing the probability of improving the listening conversion rate of the playlist list. The playlist list determining method provided by the embodiments of the present disclosure can make playlists in a playlist list have a relatively high correlation with a user to which a recommendation is made, thereby providing the probability of improving the listening conversion rate of the playlist list.

DETAILED DESCRIPTION

The technical solutions in embodiments of the present disclosure are clearly and fully described below with reference to the accompanying drawings in the embodiments of the present disclosure. Apparently, the described embodiments are merely some of the embodiments of the present disclosure, but not all the embodiments. Based on the embodiments of the present disclosure, all other embodiments obtained by a person of ordinary skill in the art without involving an inventive effort shall fall within the scope of protection of the present disclosure.

Figure 1:
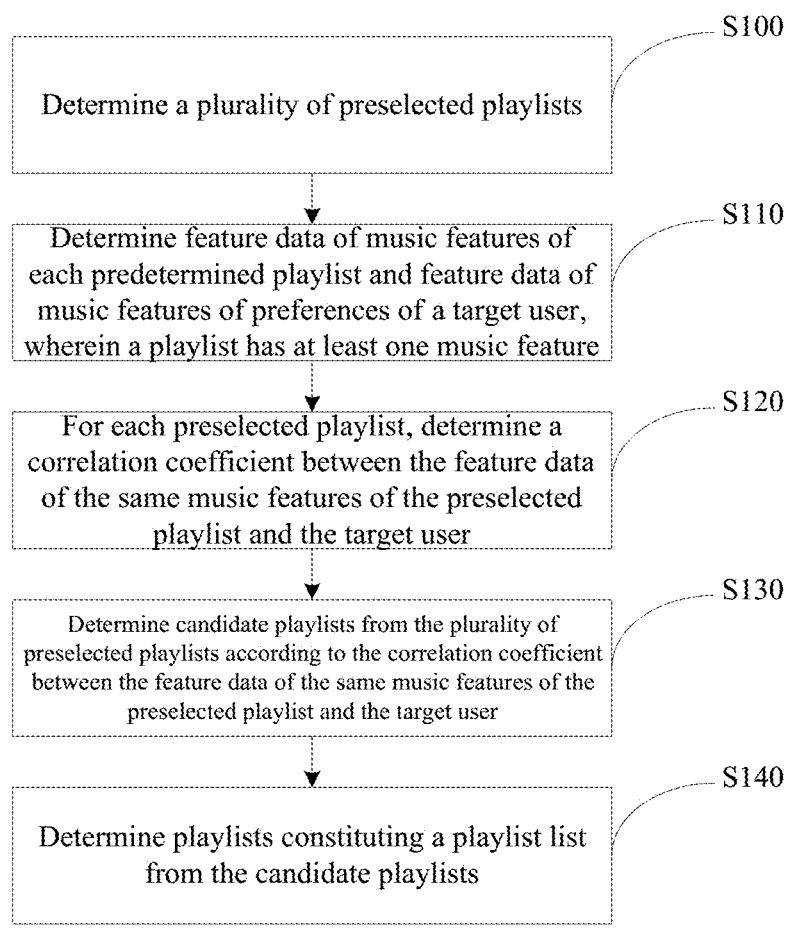
FIG. 1 is a flow chart of a playlist list determining method provided by an embodiment of the present disclosure.

FIG. 1 is a flow chart of a playlist list determining method provided by an embodiment of the present disclosure. The method can be applied to an electronic apparatus. The electronic apparatus, such as a server providing a music playing service, may also be a user side apparatus having a data processing capability. Referring to FIG. 1, the method may include steps S100 to step S140.

Step S100: determine a plurality of preselected playlists.

Optionally, the plurality of preselected playlists may be selected from a playlist library.

If playlist data of the playlist library mainly comes from User Generated Content (UGC) data, in order for a relatively good quality of a playlist list subsequently recommended to a user, a particular selection rule can be set in the embodiments of the present disclosure to select a plurality of preselected playlists that meet the selection rule from the playlist library.

For example, the selection rule may include: a playlist name conforms to a predetermined playlist name writing rule, playlist description content conforms to a predetermined playlist description content writing rule, song-related number data in the playlist conforms to a predetermined number requirement, and song-related listening data in the playlist conforms to a predetermined listening requirement, etc.

Step S110: determine feature data of music features of each preselected playlist and feature data of music features of preferences of a target user.

Optionally, the music features may considered to be the types of music attributes of the playlist. The types of the music attributes may include singers, songs, genres, decades, languages, melodies, and the like of the playlist. In the embodiments of the present disclosure, the type of at least one music attribute of the playlist can be preset as the music feature of the playlist, so that at least one music feature is preset. For example, one or more of the types of the music attributes, such as the singers, songs, genres, decades, languages, and melodies of the playlist, can be selected as the music features of the playlist.

Optionally, a singer feature of the playlist may take a singer number set of each song in the playlist as a feature vector. For example, if a playlist includes two songs of a singer A, a song of a singer B, and two songs of a singer C, then the singer feature of the playlist is ((singer A, 2), (singer B, 1), and (singer C, 2).

Optionally, a genre of songs having the largest number in the playlist can be selected as the genre of the playlist. Alternatively, the genre feature of the playlist may take the number of songs of each genre in the playlist has a feature vector. Other music features in the playlist, such as decades, languages, and melodies, may also be determined according to the method above.

Optionally, the music features of the playlist may include information about the genres, languages, decades, play amounts, and the like of the songs.

After at least one music feature of the playlist is determined, for each preselected playlist, the embodiments of the present disclosure may determine the feature data of each music feature of the preselected playlist, and the feature data of the music feature may be considered to be representative of the value of the music feature.

For example, for each music feature in the preselected playlist, related data of the music feature can be abstracted to a music feature vector in the embodiments of the present disclosure, and the value of the music feature vector of the music feature is calculated to obtain a feature value of the music feature vector of the music feature. The feature value of the music feature may be considered to be the feature data of the music feature. The feature data of each music feature of each preselected playlist can be determined by determining the feature value of each music feature in each preselected playlist.

If the music features of the playlists are a singer feature, a song feature, and a genre feature, then the related data of the singer feature of each preselected playlist may be abstracted to a singer feature vector, the related data of the song feature may be abstracted to a song feature vector, and the related data of the genre feature may be abstracted to a genre feature vector, to obtain the feature value of the singer feature vector, the feature value of the song feature, and the feature value of the genre feature value of each preselected playlist, thereby determining the feature data of the singer feature, the feature data of the song feature, and the feature data of the genre feature of each preselected playlist.

The target user is a user to which the playlist list is recommended the music features of the preferences of the target user correspond to the music features of the playlists set in the embodiments of the present disclosure. For example, when the music features of the playlists include the singer feature, the song feature, and the genre feature, the music features of the preferences of the target user also include the singer feature, the song feature, and the genre feature.

Optionally, the target user may define the specific content of the preferred music features, calculate the feature value of the specific content of each music feature of the preferences of the target user, so that the music data of each music feature of the preferences of the target user can be obtained.

Optionally, the music features of the preferences of the target user can also be analyzed by analyzing historical data of music listening of the target user in the embodiments of the present disclosure.

Step S120: determine a correlation coefficient between the feature data of each of the same music features of each preselected playlist and the target user.

After the feature data of the music features of each preselected playlist and the feature data of the music features of the preferences of the target user are determined, for the same music features of the preselected playlists and the target user, the correlation coefficients between the feature data of the same music features of the preselected playlists and the target user can be determined.

If the music features are the singer feature, the song feature, and the genre feature, for each preselected playlist, the correlation coefficient between the feature data of the singer feature, the correlation coefficient between the feature data of the song feature, and the correlation coefficient between the feature data of the genre feature of the preselected playlist and the target user can be determined.

The correlation coefficients between the feature data of the same music features of the preselected playlists and the target user reflect the correlations between the same music features of the preselected catalysts and the target user. Optionally, the correlation between the same music features of the playlist and the target user may be determined by determining the Pearson correlation coefficients between the feature data of the same music features of the preselected playlists and the target user.

Step S130: determine candidate playlists from the plurality of preselected playlists according to the correlation coefficient between the feature data of the same music features of the preselected playlist and the target user.

The candidate playlists are the playlists having higher correlations with the target user in terms of the same music features in the plurality of preselected playlists. After the correlation coefficients between the feature data of the same music features of the preselected playlists and the target user are obtained, for each preselected playlist, the playlists of the preferences of the target user in the preselected playlists can be determined by synthesizing the correlation coefficients between the feature data of all the same music features of the preselected playlists and the target user in the embodiments of the present disclosure, so as to determine the playlists of the preferences of the target user in the plurality of preselected playlists to be the candidate playlists. The number of the determined candidate playlists is more than one but less than the number of the plurality of preselected playlists.

Step S140: determine playlists constituting a playlist list from the candidate playlists.

After the candidate playlists are obtained, playlists can also be selected from the candidate playlists to constitute a playlist list.

It can be seen that the correlations between the same music features of the preselected playlists and the target user may be obtained by determining the correlation coefficients between the feature data of the same music features of the preselected playlists and the target user in the embodiments of the present disclosure, so as to determine playlists having higher correlations with the target user in terms of the same music features from the plurality of preselected playlists to obtain the candidate playlists of the preferences of the target user. The playlists constituting the playlist list are determined from the candidate playlists of the preferences of the target user, so that the probability that the target user prefers the playlists in the playlist list is enhanced, and the probability that the target user clicks and listens to the playlist list determined by the embodiments of the present disclosure after being recommended to the target user is enhanced, thereby providing the probability of improving the listening conversion rate of the playlist list. The playlist list determining method provided by the embodiments of the present disclosure can make playlists in a playlist list have a relatively high correlation with a user to which a recommendation is made, thereby providing the probability of improving the listening conversion rate of the playlist list.

Optionally, the correlation coefficients between the feature data of the same music features of the preselected playlists and the target user may be Pearson correlation coefficients. Accordingly, the approach of determining the correlation coefficient between the feature data of each of the same music features of the preselected playlists and the target user may be as follows:

For each preselected playlist, the Pearson correlation coefficient between the feature data of each of the same music features of the preselected playlist and the target user is separately determined according to the formula $$P(U, P) = \frac{U * P}{\|U\|\|P\|}.$$

Where, P(U, P) is the Pearson correlation coefficient between the feature data of one of the same music features of the preselected playlists and the target user; U is the feature data of a music feature of the preferences of the target user; P is the feature data of a music feature the same as U in the preselected playlists; * indicates a multiplication sign; and ‖ ‖ indicates a square root of a quadratic sum of each feature of the feature data therein.

For example, if U indicates the feature data of the singer feature in the playlist (i.e., the feature vector of the singer feature in the playlist), the number of singers of each song in the playlist may be used as each feature of U. If the feature data of the singer feature may be a set of ((singer A, 2), (singer B, 1), and (singer C, 2), then ((singer A, 2), (singer B, 1), and (singer C, 2) may be considered to be the features of U. Accordingly, ‖U‖ may be considered to be a square root of a quadratic sum of each feature in this vector of the singer feature.

If the music features of the playlists are the singer feature, the song feature, and the genre feature, for each preselected playlist, the correlation coefficients between the feature data of the same music features of the preselected playlists and the target user may be determined in the way as follows:

The Pearson correlation coefficient between the feature data of the singer feature of the preselected playlist and the target user may be determined according to the formula $$P(U1, P1) = \frac{U1 * P1}{\|U1\|\|P1\|}$$

in the embodiments of the present disclosure.

Where, P(U1, P1) is the Pearson correlation coefficient about the singer feature of the preselected playlist and the target user; U1 is the feature data of a singer feature of the preferences of the target user; P1 is the feature data of the singer feature in the preselected playlist.

The Pearson correlation coefficients between the feature data of the song feature of the preselected playlist and the target user is determined according to the formula $$P(U2, P2) = \frac{U2 * P2}{\|U2\|\|P2\|}.$$

Where, P(U2, P2) is the Pearson correlation coefficient between the feature data of the song feature of the preselected playlist and the target user; U2 is the feature data of a song feature of the preferences of the target user; P2 is the feature data of the song feature in the preselected playlist.

The Pearson correlation coefficient between the feature data of the genre feature of the preselected playlist and the target user is determined according to the formula $$P(U3, P3) = \frac{U3 * P3}{\|U3\|\|P3\|}.$$

Where, P(U3, P3) is the Pearson correlation coefficient between the feature data of the genre feature of the preselected playlist and the target user; U3 is the feature data of a genre feature of the preferences of the target user; P3 is the feature data of the genre feature in the preselected playlist.

By means of the calculation of the formulas above, the Pearson correlation coefficients about the singer feature, the song feature, and the genre feature of the preselected list and the target user can be separately obtained.

Figure 2:
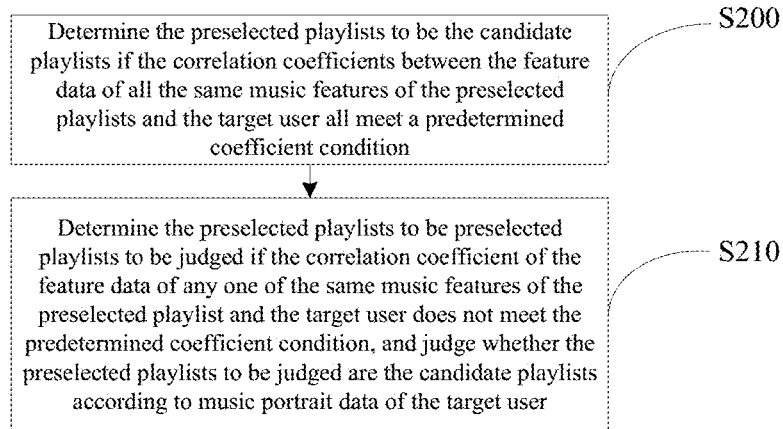
FIG. 2 is a flow chart of a method for determining candidate playlists from a plurality of preselected playlists provided by an embodiment of the present disclosure.

Optionally, after the correlation coefficients between the feature data of the same music features of the preselected playlists and the target user are determined, the playlists of the preferences of the target user in the preselected playlists can be determined by synthesizing the correlation coefficients between the feature data of all the same music features of the preselected playlists and the target user, so as to obtain the candidate playlists. Accordingly, FIG. 2 shows a flow chart of a method for determining candidate playlists from the plurality of preselected playlists provided by an embodiment of the present disclosure. Referring to FIG. 2, the method may also include step S200 to step S210.

Step S200: determine the preselected playlists to be the candidate playlists if the correlation coefficients between the feature data of all the same music features of the preselected playlists and the target user all meet a predetermined coefficient condition.

Optionally, the predetermined coefficient condition may be set coefficient values of high correlations between the same music features of the preselected playlists and the target user, and can be specifically set according to actual situations. If the correlation coefficients between the feature data of all the same music features of a certain preselected playlist and the target user all meet the predetermined coefficient condition, it can be determined that the preselected playlist has a high correlation with the target user and conforms to the preference of the target user, and the preselected playlist is determined to be a candidate playlist.

If the music features of the playlists are the singer feature, the song feature, and the genre feature, in the case that the correlation coefficient between the feature data of the singer feature, the correlation coefficient between the feature data of the song feature, and the correlation coefficient between the feature data of the genre feature of the preselected playlists and the user meet the predetermined coefficient condition, the preselected playlists can be determined as the candidate playlists.

Step 210: determine the preselected playlists to be preselected playlists to be judged if the correlation coefficients between the feature data of corresponding music features of the preselected playlist and the target user do not meet the predetermined coefficient condition, and judge whether the preselected playlists to be judged are the candidate playlists according to music portrait data of the target user.

If the music features of the playlists are the singer feature, the song feature, and the genre feature, the preselected playlists can be determined to be the preselected playlists to be judged as long as the correlation coefficient between the feature data of at least one of the singer feature, the song feature, and the genre feature of the preselected playlists and the target user does not meet the predetermined coefficient condition.

To further judge whether the target user prefers the preselected playlists to be judged, the music portrait data of the target user may be introduced. Optionally, in the embodiments of the present disclosure can determine, for the music features with correlation coefficients not meeting the predetermined coefficient condition, whether the feature data of the music features in the preselected playlists match the content of the music features indicated in the music portrait data of the target user, so as to determine whether the target user prefers the preselected playlists according to the matching result.

The music portrait data is representative of user portrait data in the field of music. The user portrait data may be considered to be user information tagging. The user portrait data is obtained by collecting and analyzing data of social attributes, living habits, and main information, such behaviors, in a certain field of the user, and then abstracting overview features of the user in the certain field. The user portrait data can help quickly finding a precise user group and implementing the matching of user requirements.

Figure 3:
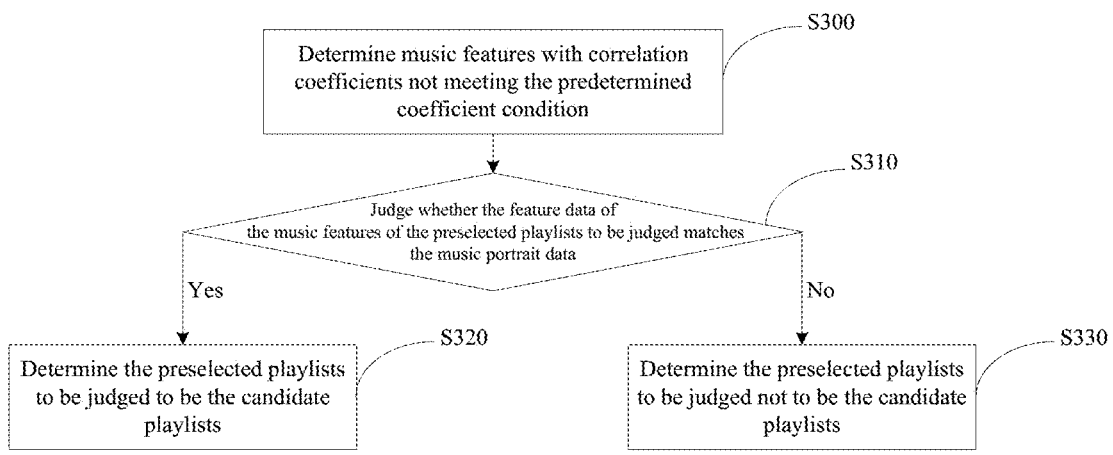
FIG. 3 is a flow chart of a method for judging whether the preselected playlists are candidate playlists on the basis of music portrait data provided by an embodiment of the present disclosure.

Accordingly, FIG. 3 shows a flow chart of a method for judging whether the preselected playlists are candidate playlists on the basis of the music portrait data provided by an embodiment of the present disclosure. Referring to FIG. 3, the method may include step S300 to step S330.

Step S300: determine music features with correlation coefficients not meeting the predetermined coefficient condition.

The music features with correlation coefficients between the feature data of the preselected playlists to be judged and the target user not meeting the predetermined coefficient condition are determined in the step S300. If the correlation coefficient between the feature data of the singer feature of the preselected playlists and the target user does not meet the predetermined coefficient condition, the music features determined in the step S300 are the singer features.

Step S310: judge whether the feature data of the music features in the preselected playlists to be judged match the content of the music features indicated in the music portrait data of the target user; if yes, execute step S320; otherwise, execute step S330.

Optionally, the embodiments of the present disclosure can directly verify whether the feature data of the music features in the preselected playlists to be judged exist in the content of the music features counted by the music portrait data; if not, mismatching is determined; and if yes, matching is determined.

Step S320: determine the preselected playlists to be judged to be the candidate playlists.

Step S330: determine the preselected playlists to be judged not to be the candidate playlists.

The method shown in FIG. 3 is only a mode of processing in the case that the correlation coefficient between the feature data of any one of the same music features of the preselected playlists and the target user does not meet the predetermined coefficient condition. Regarding the preselected playlists to be judged, the embodiments of the present disclosure can also calculate the average value of the correlation coefficients between the feature data of the music features of the preselected playlists to be judged and the target user, and determine whether the preselected playlists to be judged are playlists of the preferences of the target user according to the calculated average value. When the average value is greater than a set average value, it can be determined that the preselected playlists to be judged are the playlists of the preferences of the target user; when the average value is less than the set average value, it can be determined that the preselected playlists to be judged are not the playlists of the preferences of the target user. The set average value may be set according to actual use situations.

Optionally, after the candidate playlists are determined, a predetermined number of playlists can further be randomly selected from the candidate playlists to constitute a playlist list.

Optionally, because although the candidate playlists determined according to the correlation coefficients between the feature data of the same music features of each preselected playlist and the target user are the playlists of the preferences of the target user, most of the candidate playlists focus on a certain music feature, if the playlist list is determined whereby and is recommended to the target user, the target user may listen to the same type of songs for a long time. As a result, the user experience in playlist diversity is reduced, and visual and auditory fatigues may be caused to the target user.

If the target user has diversiform music listening habits, i.e., may like different genres of music, such as pop music, rock music, and folk music, but the degrees of liking the pop music, the rock music, and the folk music are different, the embodiments of the present disclosure can quantize the degrees of liking the pop music, the rock music, and the folk music of the target user according to the correlation coefficients between the feature data of the corresponding music features of each preselected playlist and the target user, i.e., reflect the degrees as the values of the correlation coefficients between the music features in the playlist. Based on the results obtained by the calculation, the playlists having high correlation coefficients and the same music feature are aggregately determined to be the candidate playlists, and the same type of playlists aggregately exist din the playlist list determined by these candidate playlists.

For example, the first five playlists in the playlist list are pop music related playlists, the middle three are pop music related playlists, and the last four are folk music related playlists. If the playlist list is recommended to the target user only according to the sequence of the correlations between the playlists and the target user, because five playlists of the same type are recommended successively, visual and auditory fatigues may be caused to the target user. Therefore, when determining the playlists constituting the playlist list from the candidate playlists, the playlists having high correlations to the user and diverse types may be considered.

Figure 4:
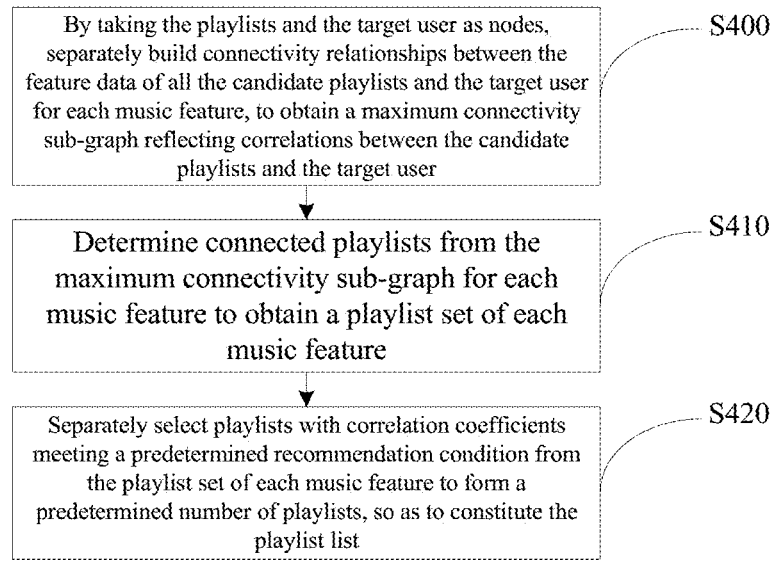
FIG. 4 is a flow chart of a method for determining playlists constituting a playlist list from candidate playlists provided by an embodiment of the present disclosure.

FIG. 4 shows a flow chart of a method for determining playlists constituting a playlist list from candidate playlists provided by an embodiment of the present disclosure. Referring to FIG. 4, the method may include step S400 to step S420.

Step S400: by taking the playlists and the target user as nodes, separately build connectivity relationships between the feature data of all the candidate playlists and the target user for each music feature, to obtain a maximum connectivity sub-graph reflecting correlations between the candidate playlists and the target user.

The maximum connectivity sub-graph may be considered to be a sub-graph formed by connecting all the nodes in the figure with the fewest edges. The edges used for connecting the nodes in the embodiments of the present disclosure may be considered to be the correlations between the feature data of the candidate playlists and the target user. If the music features of the playlists include the singer feature, the song feature, and the genre feature, regarding the same music features of the playlists and the target user (which are the singer feature, the song feature, and the genre feature in sequence), relationships may be built according to the correlations between the feature data of the same music features. After all the relationships are established, these relationships, taken as a whole, form a maximum connectivity sub-graph.

Step S410: determine connected playlists from the maximum connectivity sub-graph for each music feature to obtain a playlist set of each music feature.

Figure 5:
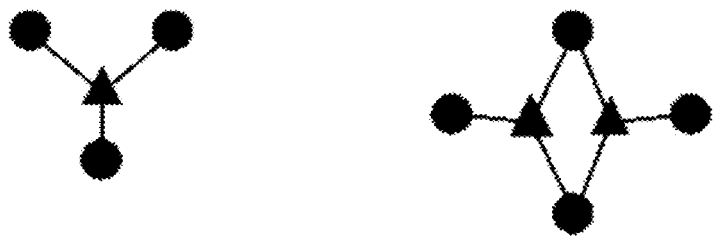
FIG. 5 is a schematic diagram of sub-graphs of associations between playlists and a user.

FIG. 5 shows a schematic diagram of sub-graphs of associations between playlists and a user. Cycles in the figure indicate playlists and triangles indicate users. In the maximum connectivity sub-graph, not all the nodes (including the playlists and the users) are connected, and the playlists corresponding to the connected nodes may be considered to have correlations, e.g., are all rock music playlists. The unconnected playlists are playlists having no association with each other, for example, one sub-graph is a rock music playlist and the other sub-graph is folk music playlist. By determining the connected playlists from the maximum connectivity sub-graph for each music feature, a playlist set of each music feature can be obtained, and the type diversity of the playlists is ensured. The nodes included in the playlist set are playlists, and the music features of the playlists in the playlist set are the same, and therefore, the playlists belong to the same type.

Step S420: separately select playlists with correlation coefficients meeting a predetermined recommendation condition from the playlist set of each music feature to constitute a playlist list.

Optionally, the playlists with correlation coefficients meeting the predetermined recommendation condition in the playlist set may be considered to be the playlists having the highest correlation coefficients in the playlist set. Optionally, the playlists with correlation coefficients meeting the predetermined recommendation condition may also be set according to actual situations.

After the playlists with correlation coefficients meeting the predetermined recommendation condition are selected from the playlist set of each feature music, the playlists of multiple types and having high correlations with the target user can be obtained. The playlist list constituted by these playlists endows the playlists in the playlist list subsequently recommended to the target user with features of diversity and high correlations with the target user, thereby providing the probability of improving the listening conversion rate of the playlists.

Optionally, after the playlist list is obtained, the playlists in the playlist list are sorted in the embodiments of the present disclosure. For example, the average value of the correlation coefficients between the feature data of the music features of each playlist in the playlist list and the target user can be determined, so as to sort the playlists in the playlist list according to the average value, for example, the playlists in the playlist list are sorted according to the average value in a descending order.

Taking the music features of the playlists which include the singer feature, the song feature, and the genre feature as an example, for each playlist in the playlist list, the embodiments of the present disclosure can determine the average value of the correlation coefficients between the feature data of the singer feature, the song feature, and the genre feature of the playlist and the target user, so as to sort the positions of the playlists in the playlist list according to the determined average values of the playlists.

Optionally, a plurality of preselected playlists can be determined from a playlist library according to a selection rule in the embodiments of the present disclosure. For example, playlists with playlist name conforming to a predetermined playlist name writing rule, playlist description content conforming to a predetermined playlist description content writing rule, song-related number data in the playlists conforming to a predetermined number requirement, and song-related listening data in the playlists conforming to a predetermined listening requirement can be selected from the playlist library to obtain the plurality of preselected playlists.

Optionally, the playlist name may conform to the playlist name writing rule in the following conditions: the number of characters in the playlist name is greater than 5 but less than 20; the number of special symbols in the playlist name is less than 20% of the total number of the characters, and the special symbols include non-mainstream symbols, Martian language symbols, personalized symbols, etc.; there are no more than two blanks at the beginning of the playlist name, and there are not more three blanks in all the characters of the playlist name; there is no punctuation, such as a comma, a period, an exclamation mark, and an interrogation mark) at the beginning of the playlist name, and there are no more than three punctuations in all the characters of the playlist name.

The playlist description content may conform to the predetermined playlist description content writing rule in the following conditions: the total number of characters in the playlist description content is greater than 5; the number of special symbols in the playlist description content shall be less than 20% of the total number of the characters.

Optionally, the song-related number data in the playlist may be the number of songs, the number of albums, the number of singers, the number of languages, and the like in the playlist. The song-related number data in the playlist may conform to the predetermined number requirement in the following conditions: the number of songs is not less than 10; the number of albums is greater than 3, and the number of songs belonging to the same album in the playlist is not more than 5; the number of singers is unlimited; and the number of languages of the songs in the playlist shall be less than 5.

Optionally, the song-related listening data in the playlist may be the listening ratio of the songs in the playlist, the full listening ratio of the playlist, the average number of persons listened to the playlist, etc., wherein the listening ratio of the songs in the playlist may be the total number of times of listening to the songs in the playlist/the total number of times of listening to all the songs in the playlist; the full listening ratio of the playlist may be the average value of full listening ratios of the songs in the playlist; the full listening ratio of each some is the ratio of the sum of each play duration of the song to (play count*song duration); the average number of persons listened to the playlist is the average number of persons listened to each song in the playlist.

The song-related listening data in the playlist may conform to the predetermined listening requirement in the following conditions: the listening ratio of the songs in the playlist is greater than 90%, the full listening ratio of the playlist is greater than 65%, and the average number of persons listened to the playlist is greater than 3.

Figure 6:
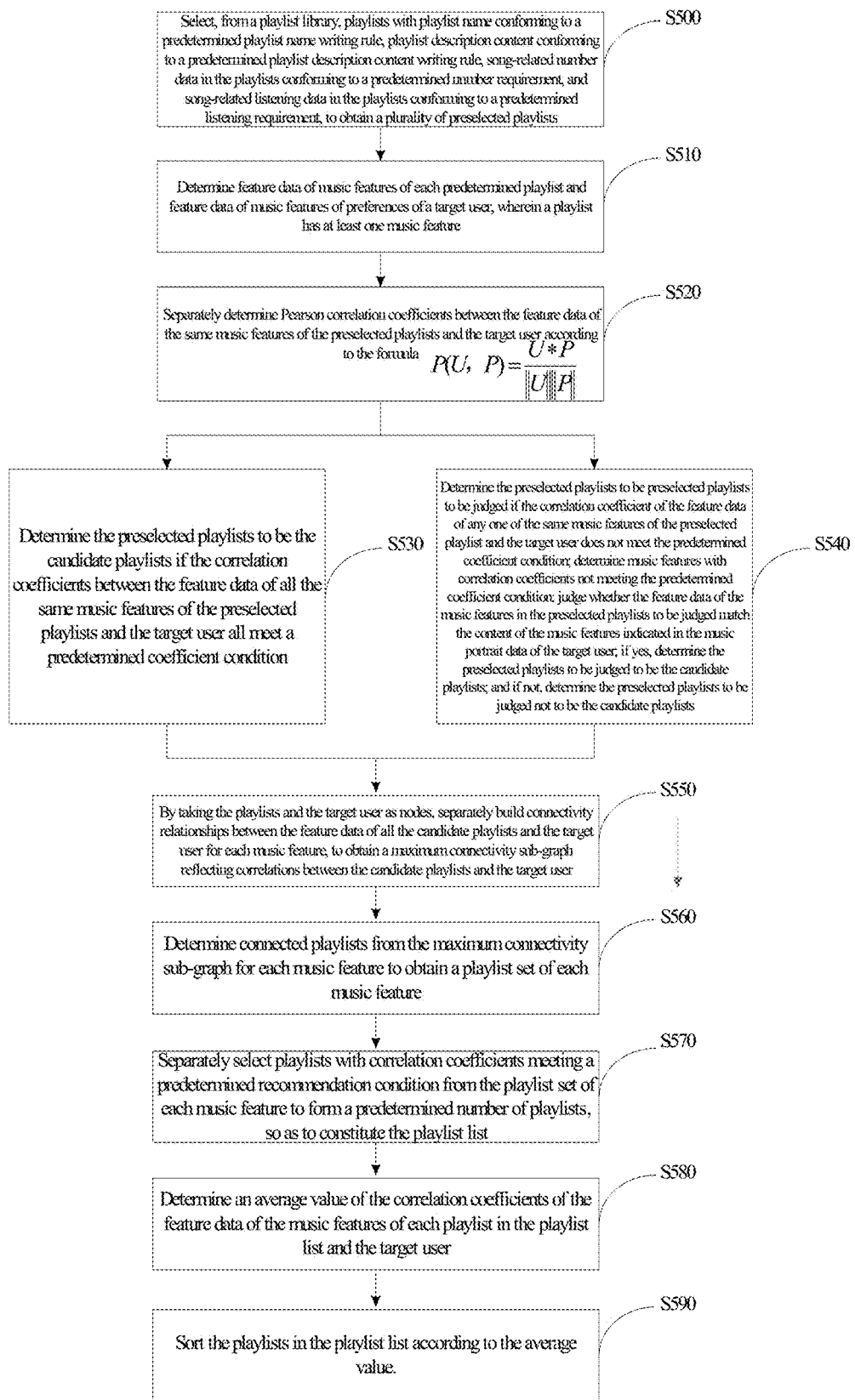
FIG. 6 is another flow chart of a playlist list determining method provided by of the present disclosure.

Preferably, FIG. 6 is another flow chart of a playlist list determining method provided by an embodiment of the present disclosure. The method can be applied to an electronic apparatus. The electronic apparatus, such as a server providing a music playing service, may also be a user side apparatus having a data processing capability. Referring to FIG. 6, the method may include steps S500 to step S590.

Step S500: select, from a playlist library, playlists with playlist name conforming to a predetermined playlist name writing rule, playlist description content conforming to a predetermined playlist description content writing rule, song-related number data in the playlists conforming to a predetermined number requirement, and song-related listening data in the playlists conforming to a predetermined listening requirement, to obtain a plurality of preselected playlists.

Step S510: determine feature data of music features of each predetermined playlist and feature data of music features of preferences of a target user, wherein a playlist has at least one music feature.

Step S520: separately determine the Pearson correlation coefficient between the feature data of each of the same music features of the preselected playlist and the target user according to the formula $$P(U, P) = \frac{U * P}{\|U\| \|P\|}.$$

Where, P(U, P) is the Pearson correlation coefficient between the feature data of one of the same song feature of the preselected playlist and the target user; U is the feature data of a song feature of the preferences of the target user; P is the feature data of the song feature in the preselected playlist.

Step S530: determine the preselected playlists to be the candidate playlists if the correlation coefficients between the feature data of all the same music features of the preselected playlists and the target user all meet a predetermined coefficient condition.

Step S540: determine the preselected playlists to be preselected playlists to be judged if the correlation coefficient between the feature data of any one of the same music features of the preselected playlist and the target user does not meet the predetermined coefficient condition; determine music features with correlation coefficients not meeting the predetermined coefficient condition; judge whether the feature data of the music features in the preselected playlists to be judged match the content of the music features indicated in the music portrait data of the target user; if yes, determine the preselected playlists to be judged to be the candidate playlists; and if not, determine the preselected playlists to be judged not to be the candidate playlists.

Step S550: by taking the playlists and the target user as nodes, separately build connectivity relationships between the feature data of all the candidate playlists and the target user for each music feature, to obtain a maximum connectivity sub-graph reflecting correlations between the candidate playlists and the target user.

Step S560: determine connected playlists from the maximum connectivity sub-graph for each music feature to obtain a playlist set of each music feature.

Step S570: separately select playlists with correlation coefficients meeting a predetermined recommendation condition from the playlist set of each music feature to form a predetermined number of playlists, so as to constitute the playlist list.

Step S580: determine an average value of the correlation coefficients between the feature data of the music features of each playlist in the playlist list and the target user.

Step S590: sort the playlists in the playlist list according to the average value.

After the playlists in the playlist list are determined and sorted, the playlist list can be recommended to the target user. Because the recommended playlist list has a relatively high correlation with the target user, the probability of improving the listening conversion rates of the playlists is provided.

Introductions to the playlist list determining device provided by the embodiments of the present disclosure are made below. The playlist list determining device described below and the playlist list determining device described above may correspond and refer to each other.

Figure 7:
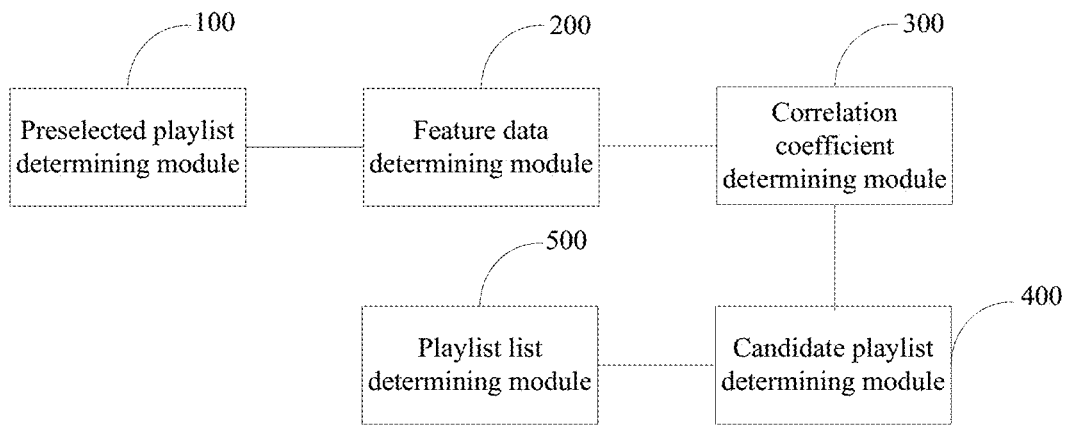
FIG. 7 is a structure block diagram of a playlist list determining device provided by of the present disclosure.

FIG. 7 is a structure block diagram of a playlist list determining device provided by an embodiment of the present disclosure. The device can be applied to an electronic apparatus. The electronic apparatus, such as a server providing a music playing service, may also be a user side apparatus having a data processing capability. Referring to FIG. 7, the device may include:

a preselected playlist determining module 100, used for determining a plurality of preselected playlists;

a feature data determining module 200, used for determining feature data of music features of each predetermined playlist and feature data of music features of preferences of a target user, wherein a playlist has at least one music feature;

a correlation coefficient determining module 300, used for determining, for each preselected playlist, a correlation coefficient between the feature data of each of the same music features of the preselected playlist and the target user;

a candidate playlist determining module 400, used for determining candidate playlists from the plurality of preselected playlists according to the correlation coefficient between the feature data of the same music features of the preselected playlist and the target user; and a playlist list determining module 500, used for determining playlists constituting a playlist list from the candidate playlists.

Figure 8:
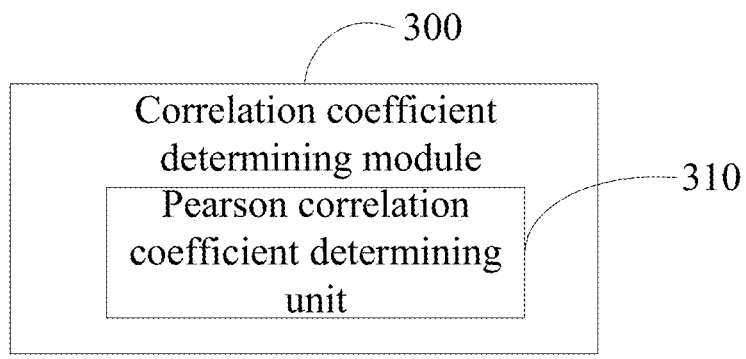
FIG. 8 is a structure block diagram of a correlation coefficient determining module provided by of the present disclosure.

Optionally, FIG. 8 shows an optional structure of the correlation coefficient determining module 300 provided by an embodiment of the present disclosure. Referring to FIG. 8, the correlation coefficient determining module 300 may include:

a Pearson correlation coefficient determining unit 310, used for separately determine the Pearson correlation coefficient between the feature data of each of the same music features of the preselected playlist and the target user according to the formula $$P(U, P) = \frac{U * P}{\|U\|\|P\|};$$

Where, P(U, P) is the Pearson correlation coefficient between the feature data of one of the same music features of the preselected playlists and the target user; U is the feature data of a music feature of the preferences of the target user; P is the feature data of a music feature the same as U in the preselected playlists; * indicates a multiplication sign; and $\|\ \|$ indicates a square root of a quadratic sum of each feature of the feature data therein.

Figure 9:
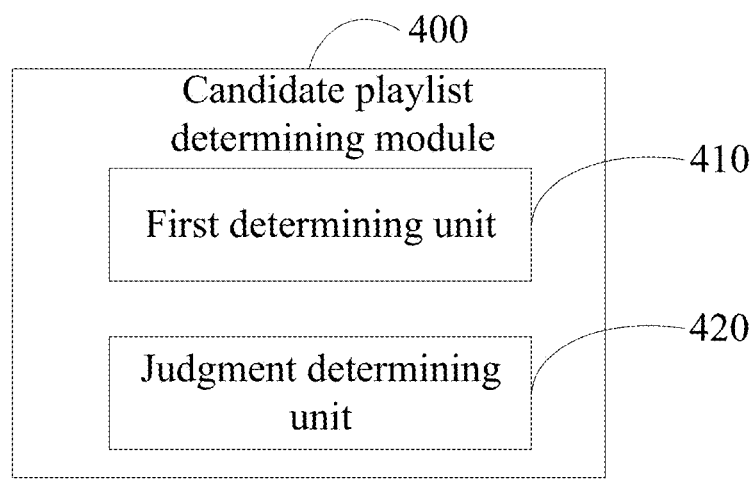
FIG. 9 is a structure block diagram of a candidate playlist determining module provided by of the present disclosure.

Optionally, FIG. 9 shows an optional structure of the candidate playlist determining module 400 provided by an embodiment of the present disclosure. Referring to FIG. 9, the candidate playlist determining module 400 may include:

A first determining unit 410, used for determining the preselected playlists to be the candidate playlists if the correlation coefficients between the feature data of all the same music features of the preselected playlists and the target user all meet a predetermined coefficient condition; and a judging unit 420, used for determining the preselected playlists to be preselected playlists to be judged if the correlation coefficient between the feature data of any one of the same music features of the preselected playlist and the target user does not meet the predetermined coefficient condition, and judging whether the preselected playlists to be judged are the candidate playlists according to music portrait data of the target user.

Figure 10:
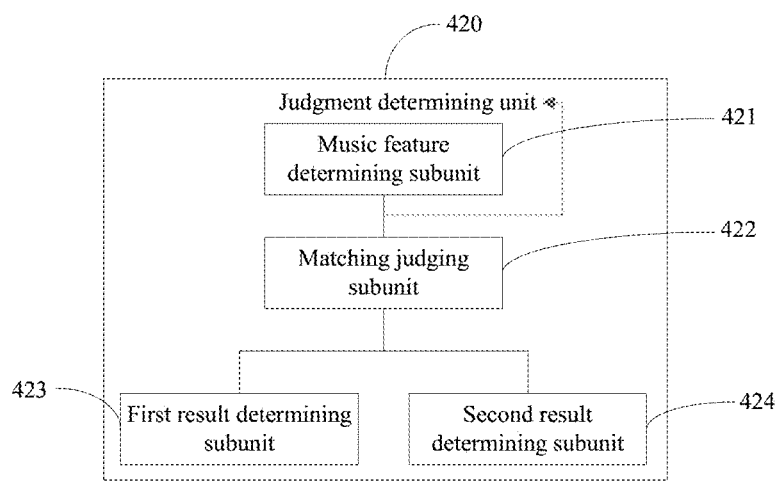
FIG. 10 is a structure block diagram of a judgment determining unit provided by an embodiment of the present disclosure.

Optionally, FIG. 10 shows an optional structure of the judging unit 420 provided by an embodiment of the present disclosure. Referring to FIG. 10, the judging unit 420 may include:

a music feature determining subunit 421, used for determining music features with correlation coefficients not meeting the predetermined coefficient condition;

a matching judging subunit 422, used for judging whether the feature data of the music features determined by the music feature determining subunit 421 match the content of the music features indicated in the user portrait data of the target user;

a first result determining subunit 423, used for determining the candidate playlists to be judged to be the candidate playlists if the judgment result of the matching judging subunit 422 is yes; and a second result determining subunit 424, used for determining the candidate playlists to be judged not to be the candidate playlists if the judgment result of the matching judging subunit 422 is not.

Optionally, the playlist list determining module 500 may be specifically used for selecting a predetermined number of playlists from the candidate lists to constitute a playlist list.

Figure 11:
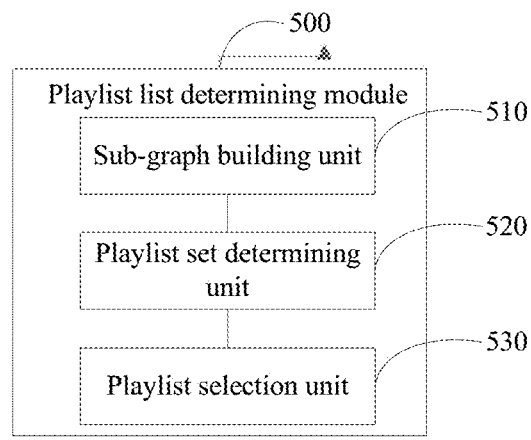
FIG. 11 is a structure block diagram of a playlist list determining module provided by an embodiment of the present disclosure.

Optionally, in the embodiments of the present disclosure, the playlist list determining module 500 can determine the playlists constituting the playlist list from the candidate playlists in combination with the diversity of the playlists. Accordingly, FIG. 11 shows an optional structure of the playlist list determining module 500 provided by an embodiment of the present disclosure. Referring to FIG. 11, the playlist list determining module 500 may include:

a sub-graph building unit 510, used for, by taking the playlists and the target user as nodes, separately building connectivity relationships between the feature data of all the candidate playlists and the target user for each music feature, to obtain a maximum connectivity sub-graph reflecting correlations between the candidate playlists and the target user;

a playlist set determining unit 520, used for determining, for each music feature, the connected playlists from the maximum connectivity sub-graph to obtain a playlist set of each music feature; and a playlist selection unit 530, used for separately selecting playlists with correlation coefficients meeting a predetermined recommendation condition from the playlist set of each music feature to form a predetermined number of playlists, so as to constitute the playlist list.

Figure 12:
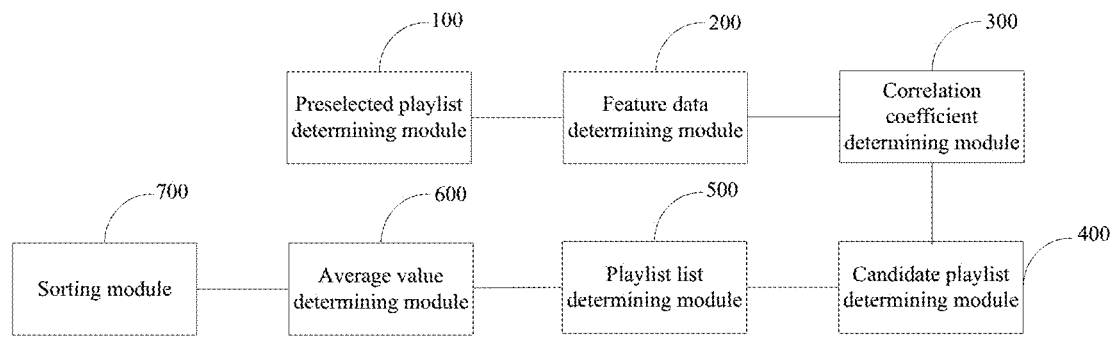
FIG. 12 is another structure block diagram of a playlist list determining device provided by an embodiment of the present disclosure.

Optionally, FIG. 12 shows another structure of the playlist list determining device provided by an embodiment of the present disclosure. As shown in FIG. 7 and FIG. 12, the device may further include:

an average value determining module 600, used for determining an average value of the correlation coefficients between the feature data of the music features of each playlist in the playlist list and the target user; and a sorting module 700, used for sorting the playlists in the playlist list according to the average value.

Optionally, the preselected playlist determining module 100 may determine a plurality of preselected playlists from a playlist library according to a preset selection rule. For example, the preselected playlist determining module 100 may be used for selecting playlists with playlist name conforming to a predetermined playlist name writing rule, playlist description content conforming to a predetermined playlist description content writing rule, song-related number data in the playlists conforming to a predetermined number requirement, and song-related listening data in the playlists conforming to a predetermined listening requirement from the playlist library to obtain the plurality of preselected playlists.

An embodiment of the present disclosure further provides an electronic apparatus. The electronic apparatus may include the playlist list determining device.

By determining the playlists in the playlist list using the electronic apparatus provided by the embodiments of the present disclosure, the determined playlist list has a relatively high correlation with the target user, and the probability of improving the listening conversion rates of the playlists is provided.

Figure 13:
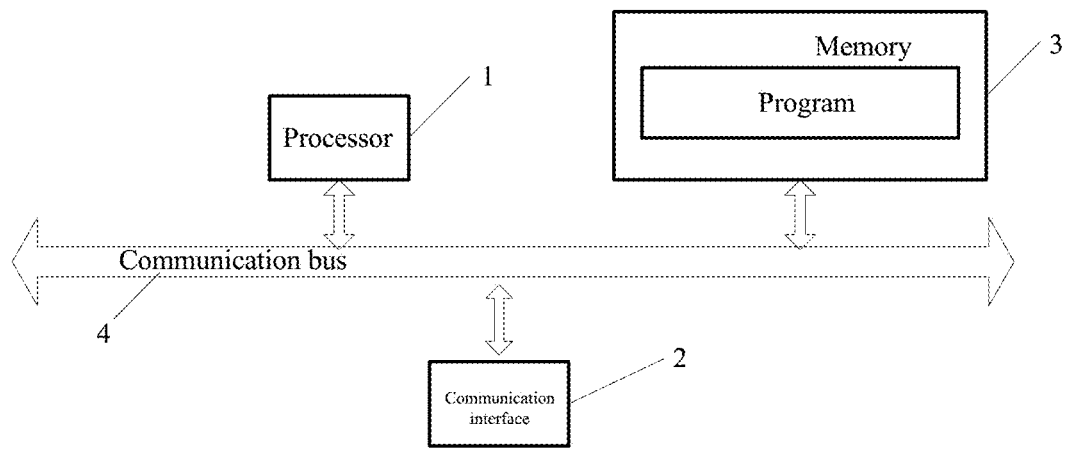
FIG. 13 is a hardware structure block diagram of an electronic apparatus provided by an embodiment of the present disclosure.

FIG. 13 is a hardware structure block diagram of an electronic apparatus provided by an embodiment of the present disclosure. The electronic apparatus may be a server, and may also be a user side apparatus. Referring to FIG. 13, the electronic apparatus may include: a processor 1, a communication interface 2, a memory 3, and a communication bus 4;

wherein the processor 1, the communication interface 2, and the memory 3 communicate with each other by means of the communication bus 4.

Optionally, the communication interface 2 may be an interface of a communication module, such as the interface of a GSM module, the interface of a CDMA module, and the interface of an LTE module;

the processor 1 is used for executing a program;

the memory 3 is used for storing the program; and the program may include a program code that comprises computer operating instructions.

The processor 1 may be a Central Processing Unit (CPU) or an Application Specific Integrated Circuit (ASIC), and is configured into one or more integrated circuits for implementing the embodiments of the present disclosure.

The memory 3 may include a high-speed RAM memory, and may also further include a non-volatile memory, such as at least one disk memory.

The program may be specifically used for:

determining feature data of music features included in preselected playlists and feature data of music features of preferences of a target user, wherein the music features included in the preselected playlists correspond to the music features of the preferences of the target user;

calculating correlation coefficients between the feature data of the music features included in the preselected playlists and the feature data of the music features corresponding to the preferences of the target user; and determining the preselected playlists to be candidate playlists when the correlation coefficients between the feature data of the music features included in the preselected playlists and the feature data of the music features corresponding to the preferences of the target user meet a preset condition.

The embodiments of the present description are described in a progressive manner, and each embodiment focuses on illustrating differences from one another. Mutual references may be made to the same or similar portions among these embodiments. The device disclosed in the embodiments corresponds to the method disclosed in the embodiments, and therefore is described relatively simply. For related ports, reference may be made to the method description.

A person skilled in the art can further understand that the individual exemplary units and arithmetic steps that are described in conjunction with the embodiments disclosed herein are able to be implemented in the electronic hardware, the computer software or a combination thereof. For describing the interchangeability between the hardware and the software clearly, the components and the steps of each example have been described according to the function generally in the description above. Whether these functions are implemented in hardware or software is determined by the specific applications and design constraint conditions of the technical solution. For each specific application, the described functions can be implemented by a person skilled in the art using different methods, but this implementation should not be considered to go beyond the scope of the present disclosure.

The steps of the method or the algorithm that are described in conjunction with the embodiments disclosed herein can be implemented in the hardware, the software module executed by the processor, or the combination thereof. The software module can be built in a Random Access Memory (RAM), the memory, a Read-Only Memory (ROM), an electrically programmable ROM, an electrically erasable programmable ROM, a register, hardware, a movable disk, a CD-ROM, or a non-transitory computer readable storage medium in any other form that is well-known in the technical field.

The above description of the disclosed embodiments enables a person skilled in the art to implement or use the present disclosure. Multiple modifications made to those embodiments are obvious to a person skilled in the art, and the ordinal principles defined therein can be implemented in other embodiments without departing from the spirit or the scope of the present disclosure. Therefore, the present disclosure will not be limited to those embodiments illustrated herein, but should be in coincidence with the widest scope that complies with the principles and the novel features disclosed therein.

The invention claimed is:

1. A playlist list determining method performed at a server having one or more processors and memory storing a plurality of program instructions be executed by the one or more processors, the method comprising:

receiving, at the server, a trigger for providing a candidate playlist to a target user of a mobile device;

determining, at the server, a plurality of preselected playlists based on a characteristic of the target user;

determining feature data of music features comprised in the plurality of preselected playlists;

determining feature data of music features of preferences of the target user, wherein the music features comprised in the plurality of preselected playlists correspond to the music features of the preferences of the target user;

calculating correlation coefficients between the feature data of the music features comprised in each of the plurality of the preselected playlists and the feature data of the music features corresponding to the preferences of the target user;

determining one of the plurality of the preselected playlists as the candidate playlist when the correlation coefficients between the feature data of the music features comprised in the one of the plurality of the preselected playlists and the feature data of the music features corresponding to the preferences of the target user meet a preset condition, wherein the music features comprise music attributes that include singers, songs, genres, decades, languages, melodies, and at least one music attribute of the preselected playlist is preset as the music feature of the preselected playlist; and providing the candidate playlist to the mobile device of the target user.

2. The playlist list determining method according to claim 1, wherein the correlation coefficients are Pearson correlation coefficients; the calculating correlation coefficients between the feature data of the music features comprised in the preselected playlists and the feature data of the music features corresponding to the preferences of the target user comprises:

determining the Pearson correlation coefficients between the feature data of the music features comprised in the preselected playlists and the feature data of the music features corresponding to the preferences of the target user according to the formula $$P(U, P) = \frac{U * P}{\|U\|\|P\|};$$

wherein P(U, P) is the Pearson correlation coefficient between the feature data of the music features in the preselected playlists and the feature data of the music features corresponding to the preferences of the target user; U is the feature data of a music feature of the preferences of the target user; P is the feature data of a music feature corresponding to U in the preselected playlists; * indicates a multiplication sign; and ‖ ‖ indicates a square root of a quadratic sum of each feature of the feature data therein.

3. The playlist list determining method according to claim 2, wherein the determining the preselected playlists as candidate playlists when the correlation coefficients between the feature data of the music features comprised in the preselected playlists and the feature data of the music features corresponding to the preferences of the target user meet a preset condition comprises:

determining the preselected playlists as candidate playlists if the correlation coefficients between the feature data of all the same music features in the preselected playlists and the preferences of the target user all meet a predetermined coefficient condition.

4. The playlist list determining method according to claim 3, further comprising:

determining the preselected playlists based on whether the correlation coefficients between the feature data of any one of the same music features in the preselected playlist and the preferences of the target user meet the predetermined coefficient condition, and judging whether one of the plurality of the preselected playlists is the candidate playlist according to music portrait data of the target user.

5. The playlist list determining method according to claim 4, wherein the judging whether one of the plurality of the preselected playlists is the candidate playlist according to music portrait data of the target user comprises:

determining music features with correlation coefficients not meeting the predetermined coefficient condition;

judging whether the feature data of the music features in the preselected playlists match content of the music features indicated in the music portrait data of the target user;

if yes, determining the one of the plurality of preselected playlists as the candidate playlist; and if not, determining the one of the plurality of preselected playlists as not the candidate playlist.

6. The playlist list determining method according to claim 1, further comprising:

selecting a predetermined number of playlists from the candidate lists to constitute a playlist list.

7. The playlist list determining method according to claim 1, wherein the determining the playlists constituting the playlist list from the candidate playlists comprises:

by taking a plurality of candidate playlists and the target user as nodes, separately building connectivity relationships between the feature data of all the candidate playlists and the target user for each music feature, to obtain a maximum connectivity sub-graph of correlations between the candidate playlists and the target user;

determining connected playlists from the maximum connectivity sub-graph for each music feature to obtain a playlist set of each music feature; and separately selecting playlists with correlation coefficients meeting a predetermined recommendation condition from the playlist set of each music feature to form a predetermined number of playlists, so as to constitute the playlist list.

8. The playlist list determining method according to claim 1, further comprising:

determining an average value of the correlation coefficients between the feature data of the music features of each candidate playlist in the playlist list and the target user; and sorting the candidate playlists in the playlist list according to the average value.

9. A server having one or more processors, memory coupled to the one or more processors, and a plurality of program instructions stored in the memory that, when executed by the one or more processors, cause the server to perform the following operations:

receiving, at the server, a trigger for providing a candidate playlist to a target user of a mobile device;

determining, at the server, a plurality of preselected playlists based on a characteristic of the target user;

determining feature data of music features comprised in the plurality of preselected playlists;

determining feature data of music features of preferences of the target user, wherein the music features comprised in the plurality of preselected playlists correspond to the music features of the preferences of the target user;

calculating correlation coefficients between the feature data of the music features comprised in each of the plurality of the preselected playlists and the feature data of the music features corresponding to the preferences of the target user;

determining one of the plurality of the preselected playlists as the candidate playlist when the correlation coefficients between the feature data of the music features comprised in the one of the plurality of the preselected playlists and the feature data of the music features corresponding to the preferences of the target user meet a preset condition, wherein the music features comprise music attributes that include singers, songs, genres, decades, languages, melodies, and at least one music attribute of the preselected playlist is preset as the music feature of the preselected playlist; and providing the candidate playlist to the mobile device of the target user.

10. The server according to claim 9, wherein the correlation coefficients are Pearson correlation coefficients; the calculating correlation coefficients between the feature data of the music features comprised in the preselected playlists and the feature data of the music features corresponding to the preferences of the target user comprises:

determining the Pearson correlation coefficients between the feature data of the music features comprised in the preselected playlists and the feature data of the music features corresponding to the preferences of the target user according to the formula $$P(U, P) = \frac{U * P}{\|U\| \|P\|};$$

wherein P(U, P) is the Pearson correlation coefficient between the feature data of the music features in the preselected playlists and the feature data of the music features corresponding to the preferences of the target user; U is the feature data of a music feature of the preferences of the target user; P is the feature data of a music feature corresponding to U in the preselected playlists; * indicates a multiplication sign; and $\|\ \|$ indicates a square root of a quadratic sum of each feature of the feature data therein.

11. The server according to claim 10, wherein the determining the preselected playlists as candidate playlists when the correlation coefficients between the feature data of the music features comprised in the preselected playlists and the feature data of the music features corresponding to the preferences of the target user meet a preset condition comprises:

determining the preselected playlists as candidate playlists if the correlation coefficients between the feature data of all the same music features in the preselected playlists and the preferences of the target user all meet a predetermined coefficient condition.

12. The server according to claim 9, wherein the operations further comprise:

selecting a predetermined number of playlists from the candidate lists to constitute a playlist list.

13. The server according to claim 9, wherein the determining the playlists constituting the playlist list from the candidate playlists comprises:

by taking a plurality of candidate playlists and the target user as nodes, separately building connectivity relationships between the feature data of all the candidate playlists and the target user for each music feature, to obtain a maximum connectivity sub-graph of correlations between the candidate playlists and the target user;

determining connected playlists from the maximum connectivity sub-graph for each music feature to obtain a playlist set of each music feature; and separately selecting playlists with correlation coefficients meeting a predetermined recommendation condition from the playlist set of each music feature to form a predetermined number of playlists, so as to constitute the playlist list.

14. The server according to claim 9, wherein the operations further comprise:

determining an average value of the correlation coefficients between the feature data of the music features of each candidate playlist in the playlist list and the target user; and sorting the candidate playlists in the playlist list according to the average value.

15. A non-transitory computer readable storage medium storing a plurality of program instructions in connection with a server having one or more processors, wherein the plurality of program instructions, when executed by the one or more processors, cause the server to perform the following operations:

receiving, at the server, a trigger for providing a candidate playlist to a target user of a mobile device;

determining, at the server, a plurality of preselected playlists based on a characteristic of the target user;

determining feature data of music features comprised in the plurality of preselected determining feature data of music features of preferences of the target user, wherein the music features comprised in the plurality of preselected playlists correspond to the music features of the preferences of the target user;

calculating correlation coefficients between the feature data of the music features comprised in each of the plurality of the preselected playlists and the feature data of the music features corresponding to the preferences of the target user; and determining one of the plurality of the preselected playlists as the candidate playlist when the correlation coefficients between the feature data of the music features comprised in the one of the plurality of the preselected playlists and the feature data of the music features corresponding to the preferences of the target user meet a preset condition, wherein the music features comprise music attributes that include singers, songs, genres, decades, languages, melodies, and at least one music attribute of the preselected playlist is preset as the music feature of the preselected playlist; and providing the candidate playlist to the mobile device of the target user.

16. The non-transitory computer readable storage medium according to claim 15, wherein the correlation coefficients are Pearson correlation coefficients; the calculating correlation coefficients between the feature data of the music features comprised in the preselected playlists and the feature data of the music features corresponding to the preferences of the target user comprises:

determining the Pearson correlation coefficients between the feature data of the music features comprised in the preselected playlists and the feature data of the music features corresponding to the preferences of the target user according to the formula $$P(U, P) = \frac{U * P}{\|U\| \|P\|};$$

wherein P(U, P) is the Pearson correlation coefficient between the feature data of the music features in the preselected playlists and the feature data of the music features corresponding to the preferences of the target user; U is the feature data of a music feature of the preferences of the target user; P is the feature data of a music feature corresponding to U in the preselected playlists; * indicates a multiplication sign; and ‖ ‖ indicates a square root of a quadratic sum of each feature of the feature data therein.

17. The non-transitory computer readable storage medium according to claim 16, wherein the determining the preselected playlists as the candidate playlists when the correlation coefficients between the feature data of the music features comprised in the preselected playlists and the feature data of the music features corresponding to the preferences of the target user meet a preset condition comprises:
   determining one of the plurality of the preselected playlists as the candidate playlist if the correlation coefficients between the feature data of all the same music features in the preselected playlists and the preferences of the target user all meet a predetermined coefficient condition.

18. The non-transitory computer readable storage medium according to claim 15, wherein the operations further comprise:
   selecting a predetermined number of playlists from the candidate lists to constitute a playlist list.

19. The non-transitory computer readable storage medium according to claim 15, wherein the determining the playlists constituting the playlist list from the candidate playlists comprises:
   by taking a plurality of candidate playlists and the target user as nodes, separately building connectivity relationships between the feature data of all the candidate playlists and the target user for each music feature, to obtain a maximum connectivity sub-graph of correlations between the candidate playlists and the target user;
   determining connected playlists from the maximum connectivity sub-graph for each music feature to obtain a playlist set of each music feature; and
   separately selecting playlists with correlation coefficients meeting a predetermined recommendation condition from the playlist set of each music feature to form a predetermined number of playlists, so as to constitute the playlist list.

20. The non-transitory computer readable storage medium according to claim 15, wherein the operations further comprise:
   determining an average value of the correlation coefficients between the feature data of the music features of each candidate playlist in the playlist list and the target user; and
   sorting the candidate playlists in the playlist list according to the average value.

* * * * *